(12) United States Patent
Imai et al.

(10) Patent No.: US 6,545,470 B2
(45) Date of Patent: Apr. 8, 2003

(54) SCANNING PROBE MICROSCOPE (75) Inventors: Yukari Imai, Tokyo (JP); Hitoshi Maeda, Tokyo (JP); Mari Tsugami, Tokyo (JP); Yoji Mashiko, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/109,659

(22) Filed: Apr. 1, 2002

(65) Prior Publication Data

US 2003/0025498 A1 Feb. 6, 2003

(30) Foreign Application Priority Data

Aug. 6, 2001 (JP) .......................................... 2001-237990

(51) Int. Cl.[7] .............................................. G01R 33/02
(52) U.S. Cl. ....................................................... 324/244
(58) Field of Search .............................. 324/244, 244.1, 324/249, 252, 260, 261, 262, 228; 250/306, 307

(56) References Cited

U.S. PATENT DOCUMENTS 5,892,223 A * 4/1999 Karpov et al. .............. 250/306
5,900,729 A * 5/1999 Moser et al. ................ 324/244
6,121,771 A * 9/2000 Moser .......................... 324/244
6,448,765 B1 * 9/2002 Chen et al. .................. 324/244

FOREIGN PATENT DOCUMENTS

JP  10-111301  4/1998

\* cited by examiner

Primary Examiner—Jay Patidar
(74) Attorney, Agent, or Firm—Oblon, Spivak, McClelland, Maier & Neustadt, P.C.

(57) ABSTRACT

It is an object to obtain a scanning probe microscope capable of effectively suppressing a reduction in precision in a measurement. A conductive probe (2C) has such a pyramid structure as to be expanded from a tip portion to a bottom surface (a surface on which a cantilever (1) is to be formed) and a semiconductor integrated circuit (12) is formed in a side surface of the conductive probe (2C). An amplifying circuit (12a) to be the semiconductor integrated circuit (12) amplifies an electrical characteristic signal given from the conductive probe (2C) to send the electrical characteristic signal to a signal processor (10) through a conductive cantilever (1C) and a signal cable (9).

10 Claims, 6 Drawing Sheets

SCANNING PROBE MICROSCOPE

BACKGROUND OF THE INVENTION

1. Field of the Invention

The present invention relates to a cantilever of a scanning probe microscope.

2. Description of the Background Art

A scanning probe microscope (SPM) can analyze and estimate a surface of a sample in an nm scale.

The SPM is roughly divided into two portions. One of the SPMs is a scanning tunneling microscope (STM) for operating the inside of a two-dimensional plane while measuring a tunnel current flowing between a surface of a sample having a conductivity and a stylus of a metal (which will be hereinafter referred to as a "probe"), thereby three-dimensionally displaying information about the surface of the sample. The other SPM is an atomic force microscope (AFM) for measuring interatomic force acting between a tip of a probe and a surface of a sample from a displacement of a very small leaf spring (hereinafter referred to as a "cantilever") and operating the inside of a two-dimensional plane, thereby three-dimensionally displaying information about concavo-convex portions formed on the surface of the sample.

The AFM is different from the STM in that it can also estimate an insulating material and does not place restrictions on a sample in principle. A measuring method and an operation principle will be described below by taking the AFM as an example.

Figure 10:
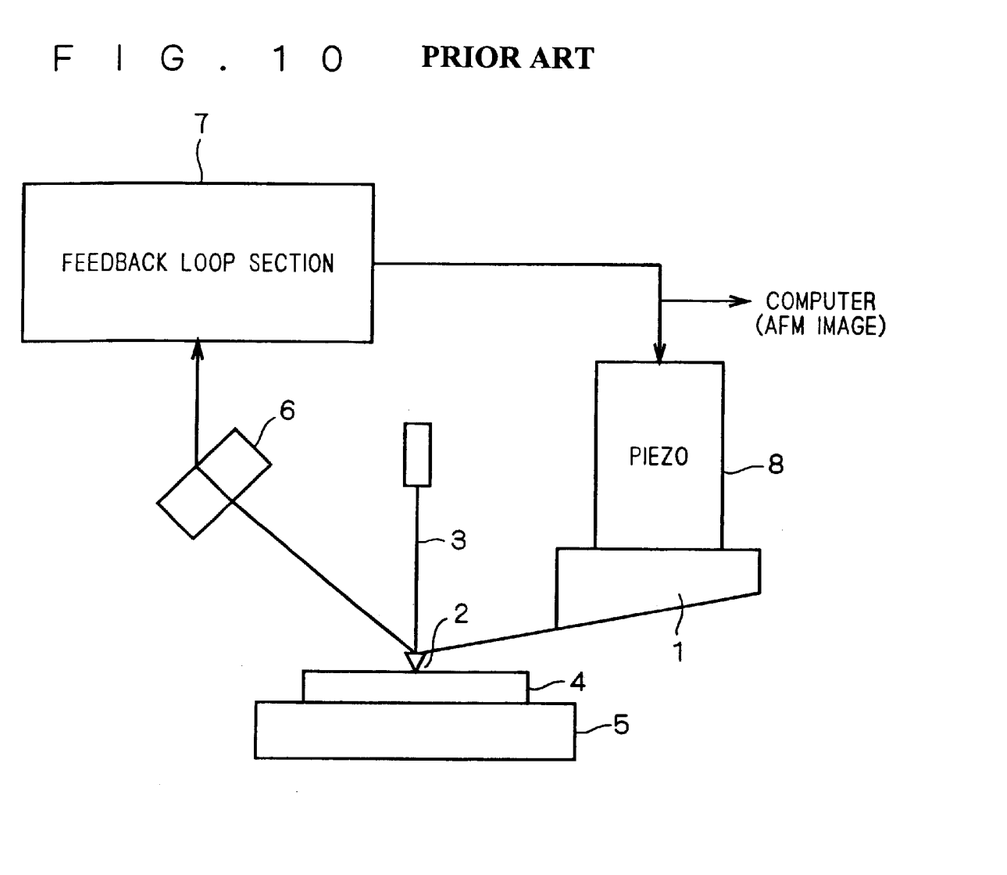
FIG. 10 is a diagram illustrating a device structure of the AFM.

FIG. 10 is a diagram illustrating a device structure of the AFM. As shown in FIG. 10, a probe 2 is fabricated in the vicinity of a tip of a cantilever 1 and a tip of the probe 2 is provided close to a surface of a sample 4. The sample 4 is mounted on a stage 5.

A laser beam 3 is irradiated on a rear face of the cantilever 1 and reflected light thereof is received by a photodiode 6, and an amount of detection obtained by the photodiode 6 (an amount of warpage of the cantilever 1) is given to a feedback loop section 7. The feedback loop section 7 sends a control signal (a signal indicative of an amount of change in a vertical direction of a piezo 8) to the piezo 8 based on the amount of detection such that the amount of detection is always constant. Upon receipt of the control signal of the feedback loop section 7, the piezo 8 brings the cantilever 1 up and down in the vertical direction based on the control signal. Moreover, the piezo 8 includes a piezo for moving the cantilever 1 in X and Y directions as well as the vertical direction.

With such a structure, the AFM first moves the sample 4 such that the probe 2 fabricated in the tip of the cantilever 1 comes to a portion just above a measuring point. Next, when the cantilever 1 is brought down and the probe 2 is caused to approach the surface of the sample 4, interatomic force is generated between the surface of the sample 4 and the probe 2. Basically, the amount of change in the interatomic force on each measuring point in the sample 4 is measured by the laser beam 3, the photodiode 6 and the feedback loop section 7, thereby detecting concavo-convex portions formed on the surface of the sample 4.

The AFM has three kinds of measuring modes, for example, a contact mode, a tapping mode and a non-contact mode.

In the contact mode, the probe 2 is caused to come in contact with the surface of the sample 4 and the concavo-convex portions formed on the surface of the sample 4 are measured from a displacement of the cantilever 1 (the amount of warpage of the cantilever 1).

In the tapping mode, the cantilever 1 is oscillated to cause the probe 2 to periodically come in contact with the surface of the sample 4, thereby measuring the concavo-convex portions formed on the surface of the sample 4 with a change in an oscillation amplitude which is caused by a variation in the interatomic force generated between the cantilever 1 and the surface of the sample 4.

In the non-contact mode, the probe 2 is not caused to come in contact with the surface of the sample 4 and the concavo-convex portions formed on the surface of the sample 4 are measured with the change in the oscillation amplitude which is caused by the variation in the interatomic force generated on the cantilever 1 and the surface of the sample 4.

The photodiode 6 detects the displacement of the cantilever 1 and the change in the oscillation amplitude as a change in an angle of the laser beam 3 reflected by the rear face of the cantilever 1. The feedback loop section 7 gives a control signal to the piezo 8 to carry out feedback control such that the amount of warpage of the cantilever 1 is always constant in the contact mode and the oscillation amplitude of the cantilever 1 is maintained to be constant in the tapping and non-contact modes.

An amount of movement in a vertical direction on each measuring point in the sample 4 (the control signal of the feedback loop section 7) can be stored in an external computer and the computer can three-dimensionally display the concavo-convex portions formed on the surface of the sample 4 based on the stored data.

Moreover, the AFM can measure the concavo-convex portions formed on the surface of the sample 4, and furthermore, can measure various electrical characteristics of the sample 4, for example, the resistance, magnetic force and surface potential of the sample 4 and the like simultaneously with the measurement of the concavo-convex portions. In this case, it is necessary to change the cantilever 1 and the measuring mode corresponding to a measuring item.

Figure 11:
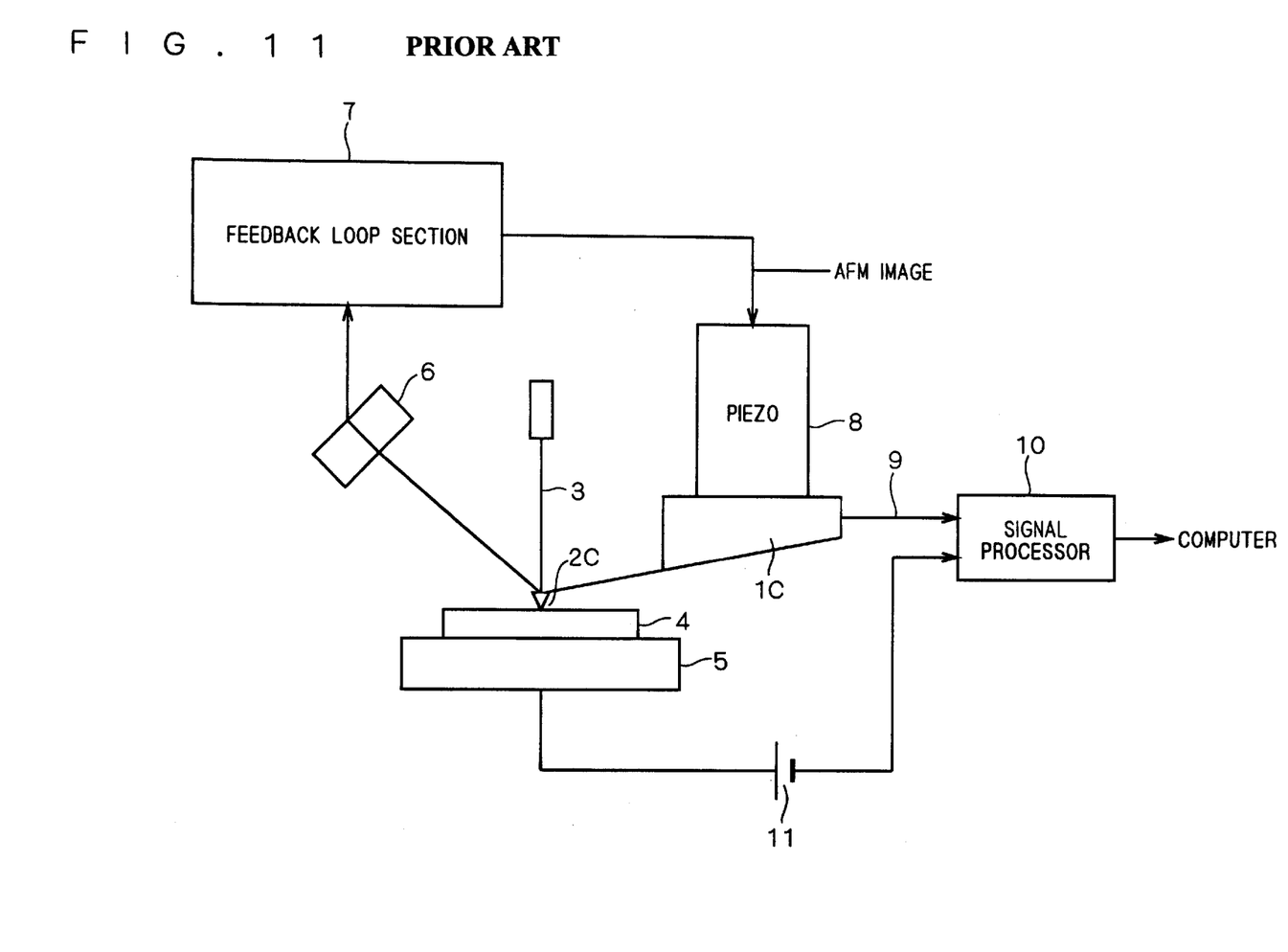
FIG. 11 is a diagram illustrating the device structure of the AFM in the case in which a current of a sample is to be measured.

An operation will be described by taking a measurement of a current of the sample 4 as an example. FIG. 11 is a diagram illustrating the device structure of the AFM in the case in which the current of the sample is to be measured.

FIG. 11 is a diagram illustrating the device structure of the AFM in which a resistance can also be measured. As compared with FIG. 10, the cantilever 1 is replaced with a conductive cantilever 1C and the probe 2 is replaced with a conductive probe 2C. A signal cable 9 is provided for sending an electrical characteristic signal of a sample such as a current measured by the conductive probe 2C to a signal processor 10. The signal processor 10 performs a signal processing such as signal amplification for the electrical characteristic signal of the sample measured by the conductive probe 2C. There is provided a DC voltage 11 to be applied to the sample for measuring a resistance.

As shown in FIG. 11, a substance formed of a conductive material is used for the conductive cantilever 1C and, for example, a substance obtained by implanting an impurity into Si (silicon), a substance formed by depositing a conductive film over a Si cantilever or the like is used. The conductive cantilever 1C and the conductive probe 2C are used in place of the probe when the electrical characteristic is to be measured by a tester. In order to measure the current of the sample 4, it is necessary to cause the conductive probe 2C to come in contact with the surface of the sample 4. The measurement is carried out in the contact mode.

A voltage is applied between the sample 4 and the probe (conductive probe 2C) while measuring the concavo-convex portions formed on the surface of the sample 4 by the measuring method in the contact mode, and a current flowing between the sample, the probe and the cantilever is measured as the electrical characteristic signal. The electrical characteristic signal obtained by the conductive probe 2C is sent from the conductive cantilever 1C to the signal processor 10 through the signal cable 9 and data subjected to a signal processing based on the electrical characteristic signal by the signal processor 10 are stored in a computer, and the computer can three-dimensionally display measurement data such as a resistance value of the sample which is calculated based on the stored data.

In the case in which the electrical characteristic of the sample other than the concavo-convex portions formed on the surface of the sample, for example, the resistance, the surface potential and the like are to be measured by the conventional atomic force microscope (AFM), the electrical characteristic signal measured by the probe is sent from a cantilever to a signal processing circuit such as an amplifier through a signal cable. Therefore, a noise is mixed into the electrical characteristic signal during transmission from the probe or a signal level of the electrical characteristic signal is reduced. For this reason, there is a problem in that the resolution or precision of measurement data is reduced to cause a reduction in precision in a measurement.

SUMMARY OF THE INVENTION

A first aspect of the present invention is directed to a scanning probe microscope having a probe for sample analysis and acquiring measurement data based on an electrical characteristic signal of a sample obtained from the probe, wherein the probe has a pyramid structure, and a signal processing section for performing a signal processing of the electrical characteristic signal to suppress a deterioration in the electrical characteristic signal is provided on/in a side surface of the probe.

A second aspect of the present invention is directed to the scanning probe microscope according to the first aspect of the present invention, wherein the signal processing section includes a semiconductor integrated circuit fabricated in a side surface of the probe.

A third aspect of the present invention is directed to the scanning probe microscope according to the first aspect of the present invention, wherein the signal processing section includes a semiconductor device adhered to a side surface of the probe.

A fourth aspect of the present invention is directed to the scanning probe microscope according to any of the first to third aspects of the present invention, wherein the signal processing section includes an amplifying circuit for amplifying the electrical characteristic signal.

A fifth aspect of the present invention is directed to the scanning probe microscope according to any of the first to third aspects of the present invention, wherein the signal processing section includes a memory for storing the electrical characteristic signal.

A sixth aspect of the present invention is directed to the scanning probe microscope according to the fifth aspect of the present invention, wherein the memory includes a DRAM.

A seventh aspect of the present invention is directed to the scanning probe microscope according to the fifth aspect of the present invention, wherein the memory includes an SRAM.

An eighth aspect of the present invention is directed to the scanning probe microscope according to the fifth aspect of the present invention, wherein the memory includes a flash memory.

A ninth aspect of the present invention is directed to the scanning probe microscope according to any of the first to third aspects of the present invention, wherein the signal processing section includes a microprocessor for performing a predetermined operation processing for the electrical characteristic signal.

A tenth aspect of the present invention is directed to the scanning probe microscope according to any of the first to seventh aspects of the present invention, wherein the signal processing section includes a plurality of signal processing sections for performing signal processings which are different from each other, the plurality of signal processing sections are provided on/in different side surfaces of the probe, respectively, and are isolated from each other.

According to the first aspect of the present invention, the signal processing of the electrical characteristic signal is performed by the signal processing section provided on/in the side surface of the probe. Therefore, it is possible to perform the signal processing, for example, to avoid a disturbance such as a noise generated when propagating the electrical characteristic signal from the probe. Thus, it is possible to effectively suppress a reduction in precision in a measurement.

According to the second aspect of the present invention, the semiconductor integrated circuit is fabricated in the side surface of the probe. Consequently, it is possible to obtain a signal processing section having a high stability which is firmly integrated with the probe.

According to the third aspect of the present invention, the semiconductor device is adhered to the side surface of the probe. Consequently, the semiconductor device can be adhered to the side surface of the probe after it is manufactured independent of the probe. Correspondingly, it is possible to relieve time and labor required for the manufacture.

According to the fourth aspect of the present invention, the amplifying circuit is provided on/in the side surface of the probe. Consequently, it is possible to obtain an amplified electrical characteristic signal which is resistant to a disturbance such as a noise.

According to the fifth aspect of the present invention, the memory is provided on/in the side surface of the probe. Consequently, the electrical characteristic signal obtained by the probe can be stored in such a situation that there is no room for mixing a disturbance such as a noise. Accordingly, it is possible to obtain measurement data having high precision based on the electrical characteristic signal stored in the memory.

According to the sixth aspect of the present invention, the DRAM is provided on/in the side surface of the probe. Consequently, it is possible to store an electrical characteristic signal having a large capacity.

According to the seventh aspect of the present invention, the SRAM is provided on/in the side surface of the probe. Consequently, it is possible to store an electrical characteristic signal with comparatively low power consumption.

According to the eighth aspect of the present invention, the flash memory is provided on/in the side surface of the probe. Consequently, it is possible to store an electrical characteristic signal with a high stability irrespective of the presence of power supply.

According to the ninth aspect of the present invention, the microprocessor is provided on/in the side surface of the probe. Consequently, it is possible to substitute a predetermined operation processing for a part of a measurement data operation processing based on the electrical characteristic signal.

According to the tenth aspect of the present invention, it is possible to perform a comparatively complicated processing by linking the respective signal processings of the signal processing sections together.

In order to solve the above-mentioned problem, it is an object of the present invention to provide a scanning probe microscope capable of effectively suppressing a reduction in precision in a measurement.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Embodiment>

Figure 1:
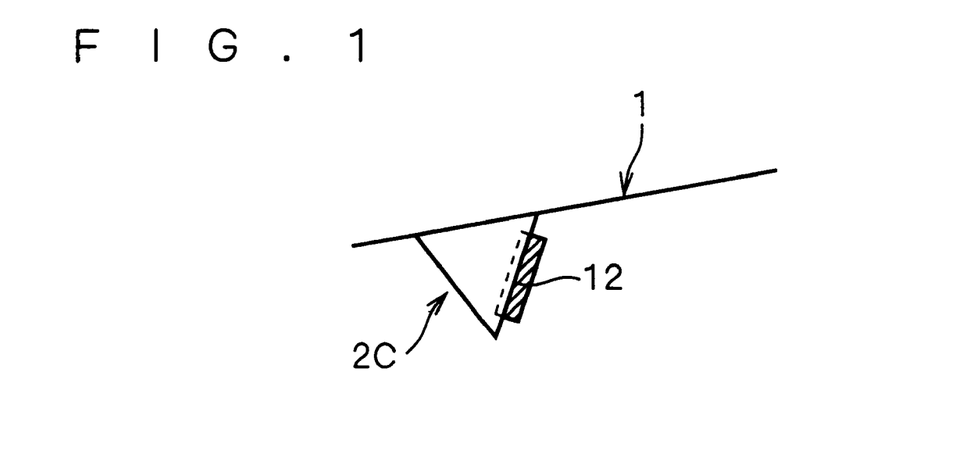
FIG. 1 is a diagram illustrating a structure of a side surface of a cantilever in an AFM according to a first embodiment.
Figure 2:
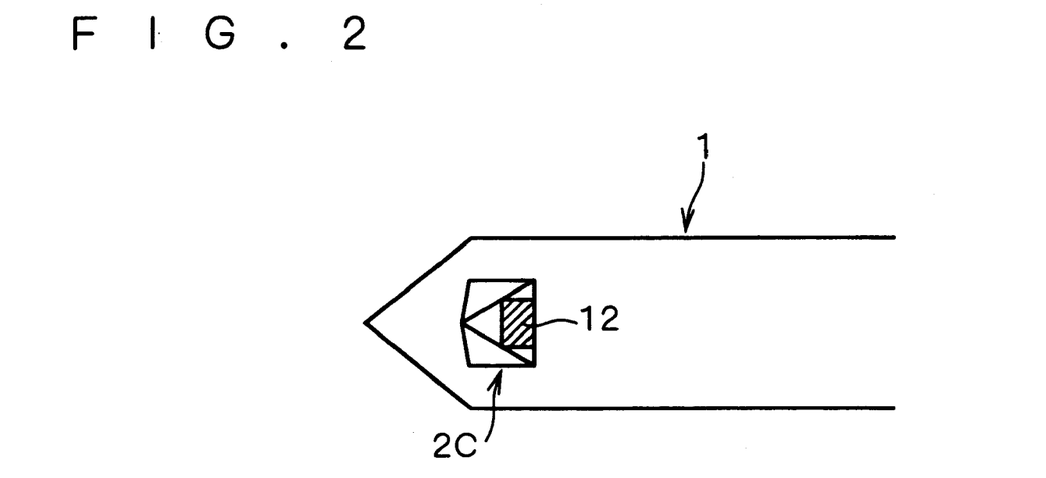
FIG. 2 is a diagram illustrating a structure of the cantilever in FIG. 1 as seen from a front part.

FIG. 1 is a diagram illustrating a structure of a side surface of a cantilever in an AFM according to a first embodiment of the present invention and FIG. 2 is a diagram illustrating a structure of the cantilever in FIG. 1 as seen from a front part (below).

As shown in these drawings, a conductive probe 2C has such a pyramid structure as to be expanded from a tip portion to a bottom surface (a surface on which a cantilever 1 is to be formed) and a semiconductor integrated circuit 12 is formed in a side surface of the conductive probe 2C. Although the semiconductor integrated circuit 12 is slightly deformed to be focused in FIG. 2, it actually has the shape of a four-sided pyramid.

Accordingly, the side surface of the conductive probe 2C has a comparatively large surface area in the vicinity of the bottom surface (particularly, in the case in which the probe has a height of approximately 10 to 15 $\mu$m and a radius of curvature is comparatively large). By making full use of a technique for manufacturing a semiconductor integrated circuit including a microfabrication technique, a thin film forming method and the like, therefore, the semiconductor integrated circuit 12 can be fabricated in the side surface of the conductive probe 2C.

The whole structure is the same as the conventional structure shown in FIG. 11. Moreover, there is proposed a method in which a metal wiring is formed on a surface of the conductive cantilever 1C through an insulating film and a power is supplied from a holder (not shown) of the cantilever 1C to the semiconductor integrated circuit 12 through the metal wiring.

In the first embodiment, the conductive cantilever 1C is used for the cantilever 1 and an amplifying circuit 12a is used for the semiconductor integrated circuit 12.

Figure 3:
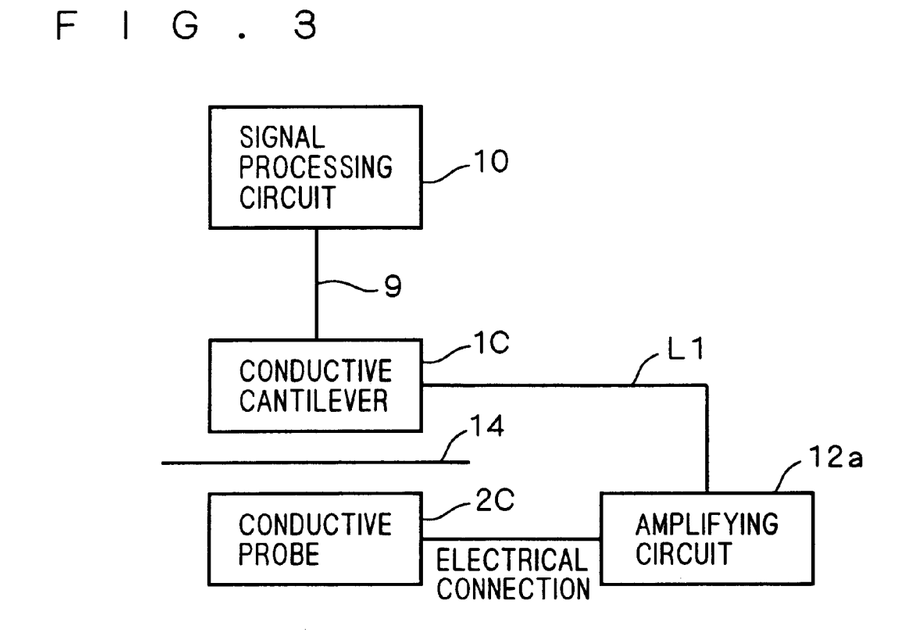
FIG. 3 is a diagram illustrating a structure of an electrical connection according to the first embodiment.

FIG. 3 is a diagram illustrating a structure of an electrical connection according to the first embodiment. As shown in FIG. 3, the conductive probe 2C is isolated from the conductive cantilever 1C through an insulating film 14 to maintain an insulating property and is electrically connected to the amplifying circuit 12a directly, through a wiring or the like. The amplifying circuit 12a is electrically connected to the conductive cantilever 1C through a signal line L1. The conductive cantilever 1C is electrically connected to a signal cable 9 as shown in FIG. 11.

An operation for measuring a current value through the AFM according to the first embodiment will be described below.

In the measuring operation, an amount of warpage of the conductive cantilever 1C is detected by a photodetector (a photodiode 6, a feedback loop section 7) on each measuring point and concavo-convex portions formed on a surface of a sample 4 are measured in the same manner as in the conventional art. At the same time, a voltage is applied between the sample 4 and the conductive probe 2C to measure a current value as an electrical characteristic signal on each measuring point. The electrical characteristic signal is amplified by the amplifying circuit 12a and is then sent to a signal processor 10 through the signal line L1, the conductive cantilever 1C and the signal cable 9.

As compared with the conventional structure in which the electrical characteristic signal obtained by the conductive probe 2C is exactly transmitted to the signal processor 10 through the cantilever 1, accordingly, the electrical characteristic signal obtained by the conductive probe 2C and amplified by the amplifying circuit 12a is transmitted to the signal processor 10 through the conductive cantilever 1C in the present embodiment.

Consequently, it is possible to effectively prevent the electrical characteristic signal from being deteriorated by a disturbance such as a noise or a resistance component which is generated on a current path from the conductive probe 2C to the signal processor 10. The electrical characteristic signal thus amplified is further processed by the signal processor 10 and is then stored in a storage section of an external computer. The computer can two-dimensionally display a current value (measurement data) of the sample 4 which is calculated based on the electrical characteristic signal stored therein.

As described above, the amplifying circuit 12a for amplifying a signal level of the electrical characteristic signal is fabricated as the semiconductor integrated circuit 12 in the side surface of the conductive probe 2C for carrying out a measurement in the present embodiment. Therefore, the amplified electrical characteristic signal can be sent to the conductive cantilever 1C, and it is possible to effectively suppress a deterioration in the electrical characteristic signal due to a noise or a resistance component which is the drawback of the conventional method and to enhance a resolution of evaluation data and precision in measurement data. Consequently, the quality of the conductivity of the cantilever does not greatly influence the precision in the measurement data. Correspondingly, the yield of the conductive cantilever 1C can also be enhanced. In addition, the semiconductor integrated circuit 12 is fabricated in the side surface of the conductive probe 2C. Therefore, it is possible to obtain a structure having a high stability in which the probe 2C and the semiconductor integrated circuit 12 are integrated firmly.

<Second Embodiment>

In an AFM according to a second embodiment, an insulating cantilever 1I is constituted as a cantilever 1 and a memory 12b is constituted as a semiconductor integrated circuit 12 formed in a side surface of a conductive probe 2C. A whole structure is the same as that in the conventional example shown in FIG. 11, and structures of the cantilever 1, the semiconductor integrated circuit 12 and the like are the same as those in the first embodiment shown in FIGS. 1 and 2.

Figure 4:
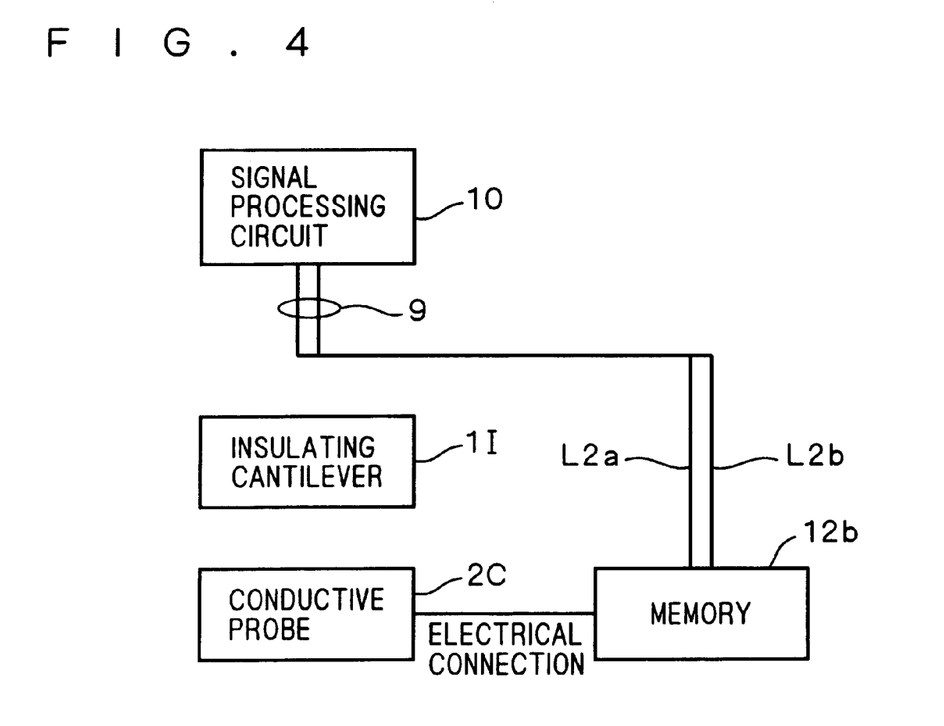
FIG. 4 is a diagram illustrating a structure of an electrical connection according to a second embodiment.

FIG. 4 is a diagram illustrating a structure of an electrical connection according to the second embodiment. As shown in FIG. 4, the conductive probe 2C is electrically connected to the memory 12b. A control signal such as an address signal to be sent from a microcomputer (not shown) is given to the memory 12b through a signal processing section 10, a signal cable 9 and a control signal line L2a. Moreover, data stored in the memory 12b are given to the microcomputer through an output signal line L2b, the signal cable 9 and the signal processing section 10. The control signal line L2a and the output signal line L2b are formed on the insulating cantilever 1I in the same manner as a metal wiring for power supply described in the first embodiment. With the structure shown in FIG. 4, it is necessary to constitute the signal cable 9 capable of transmitting and receiving a plurality of signals.

An operation for measuring a current value through the AFM according to the second embodiment will be described below.

In the measuring operation, an amount of warpage of the insulating cantilever 1I is detected by a photodetector on each measuring point and concavo-convex portions formed on a surface of a sample 4 are measured in the same manner as in the first embodiment. At the same time, a voltage is applied between the sample 4 and the conductive probe 2C to measure a current value as an electrical characteristic signal on each measuring point. The electrical characteristic signal is amplified by an amplifying function in the memory 12b and is then stored accurately. Subsequently, the data (electrical characteristic signal) stored in the memory 12b are transmitted to the signal processor 10 through the output signal line L2b and the signal cable 9 if necessary.

In the same manner as in the first embodiment, accordingly, the electrical characteristic signal obtained by the conductive probe 2C is transmitted as the stored data having a high stability stored in the memory 12b to the signal processor 10 through the output signal line L2b and the signal cable 9 in the present embodiment.

In the same manner as in the first embodiment, therefore, it is possible to effectively prevent the electrical characteristic signal from being deteriorated by a disturbance such as a noise or a resistance component generated on a current path from the output signal line L2b to the signal processor 10 which is formed on the insulating cantilever 1I in the present embodiment.

Examples of the memory 12b include a DRAM, an SRAM, a flash memory and the like. There are advantages that an electrical characteristic signal having a large capacity can be retained in the DRAM, a consumed current can be reduced in the SRAM and stable storage can be obtained, that is, data are not erased even if a power source is turned off in the flash memory.

As described above, the memory 12b for storing the electrical characteristic signal obtained by the probe carrying out a measurement is fabricated in the side surface of the probe in the present embodiment. In addition to the effect of the first embodiment, therefore, it is possible to further obtain an effect that a data retaining function on the computer side can be simplified in a system for measuring an electrical characteristic of a sample which comprises an AFM and a computer.

<Third Embodiment>

In an AFM according to a third embodiment, an insulating cantilever 1I is constituted as a cantilever 1 and a microprocessor 12c is constituted as a semiconductor integrated circuit 12 formed in a side surface of a conductive probe 2C. A whole structure is the same as that in the conventional example shown in FIG. 11 and the semiconductor integrated circuit 12 is the same as that in the first embodiment shown in FIGS. 1 and 2. A structure of an electrical connection is almost the same as the structure shown in FIG. 4, and the memory 12b is replaced with the microprocessor 12c, and a control signal for the microprocessor 12c is sent through a control signal line L2a and a signal output from the microprocessor 12c is supplied from an output signal line L2b.

An operation for measuring a current value through the AFM according to the third embodiment will be described below.

In the measuring operation, an amount of warpage of the insulating cantilever 1I is detected by a photodetector on each measuring point and concavo-convex portions formed on a surface of a sample 4 are measured in the same manner as in the first embodiment. At the same time, a voltage is applied between the sample 4 and the conductive probe 2C to measure a current value as an electrical characteristic signal on each measuring point. The electrical characteristic signal is amplified by an amplifying function in the microprocessor 12c and is then subjected to a predetermined operation processing. Subsequently, an electrical characteristic signal having a high stability which is subjected to the operation in the microprocessor 12c is transmitted to a signal processor 10 through the output signal line L2b and a signal cable 9 if necessary.

In the same manner as in the first embodiment, accordingly, the operated electrical characteristic signal obtained by operating the electrical characteristic signal acquired in the conductive probe 2C by means of the microprocessor 12c is transmitted to the signal processor 10 through the output signal line L2b and the signal cable 9 in the present embodiment. For the operation processing of the microprocessor 12c, there can be proposed a comparatively simple operation processing to be a part of operation processings of a computer based on a signal processed by the signal processor 10.

In the same manner as in the second embodiment, therefore, it is possible to effectively prevent the electrical characteristic signal from being deteriorated by a disturbance such as a noise or a resistance component which is generated on a current path from the conductive probe 2C to the signal processor 10 in the present embodiment.

As described above in the present embodiment, furthermore, the microprocessor 12c for carrying out the operation processing for the electrical characteristic signal obtained by the probe is fabricated in the side surface of the probe. In addition to the effect of the first embodiment, therefore, in a system for measuring the electrical characteristic of a sample which comprises an AFM and a computer, it is possible to further obtain an effect that a data operating function on the computer side can be simplified by causing the microprocessor 12c to execute a part of the operation processings on the computer side.

<Fourth Embodiment>

Figure 5:
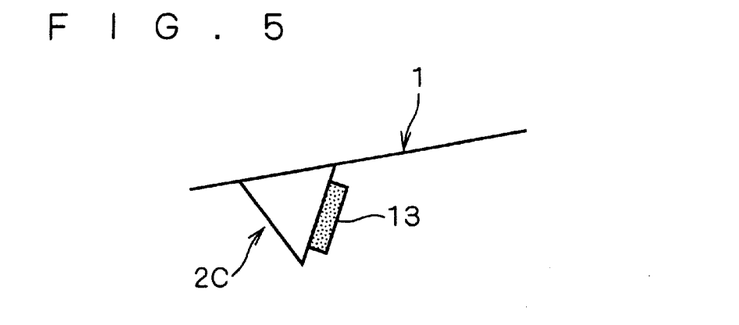
FIG. 5 is a diagram illustrating a structure of a side surface of a cantilever in an AFM according to a fourth embodiment.
Figure 6:
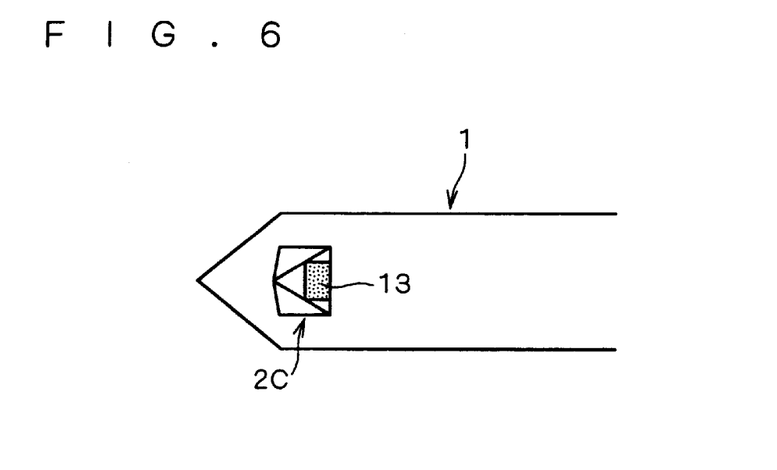
FIG. 6 is a diagram illustrating a structure of the cantilever in FIG. 5 as seen from a front part.

FIG. 5 is a diagram illustrating a structure of a side surface of a cantilever in an AFM according to a fourth embodiment of the present invention and FIG. 6 is a diagram showing a structure of the cantilever in FIG. 5 as seen from a front part (below).

As shown in these drawings, a semiconductor device (semiconductor chip) 13 is bonded to a side surface of a conductive probe 2C. As described above, the side surface of the conductive probe 2C has a comparatively large area in the vicinity of a bottom surface. Therefore, a very fine semiconductor device 13 manufactured by microfabrication can be bonded to the side surface of the conductive probe 2C.

The bonding implies that the semiconductor device 13 manufactured in another process is bonded to the side surface of the conductive probe 2C in the same manner as the bonding of a plurality of semiconductor chips in an MCP (Multi Chip Package) to be used in a mobile telephone, for example. Accordingly, it is possible to bond and adhere the semiconductor device 13 to the side surface of the conductive probe 2C after manufacturing the semiconductor device 13 independent of the conductive probe 2C. Correspondingly, it is possible to relieve time and labor required for the manufacture.

In the first embodiment, the conductive cantilever 1C is used as the cantilever 1 and an amplifying circuit 13a is used as the semiconductor device 13.

A whole structure is the same as the structure shown in FIG. 11. Moreover, the power supply to the semiconductor device 13 is carried out in the same manner as in the first embodiment and the relationship of an electrical connection is obtained in the same manner as that in the first embodiment shown in FIG. 3 (which is different in that the amplifying circuit 12a is replaced with the amplifying circuit 13a).

An operation for measuring a current value through the AFM according to the fourth embodiment will be described below.

In the measuring operation, an amount of warpage of the conductive cantilever 1C is detected by a photodetector on each measuring point and concavo-convex portions formed on a surface of a sample 4 are measured in the same manner as in the first embodiment. At the same time, a voltage is applied between the sample 4 and the conductive probe 2C to measure a current value as an electrical characteristic signal on each measuring point. The electrical characteristic signal is amplified by the amplifying circuit 13a and is then sent to a signal processor 10 through the conductive cantilever 1C and a signal cable 9.

As compared with the conventional structure in which the electrical characteristic signal obtained by the conductive probe 2C is exactly transmitted to the signal processor 10 through the cantilever 1, accordingly, the electrical characteristic signal amplified by the amplifying circuit 13a is transmitted to the signal processor 10 through the conductive cantilever 1C in the present embodiment.

Consequently, it is possible to effectively prevent the electrical characteristic signal from being deteriorated by a disturbance such as a noise or a resistance component which is generated on a current path from the conductive cantilever 1C to the signal processor 10. Data obtained after carrying out the signal processing of the electrical characteristic signal by the signal processor 10 are stored in a computer and the computer can two-dimensionally display measurement data to be a current value of the sample 4 which is calculated based on the data stored therein.

As described above, the amplifying circuit 13a for amplifying a signal level is bonded as the semiconductor device 13 to the side surface of the conductive probe 2C for carrying out a measurement in the present embodiment. Therefore, the amplified electrical characteristic signal can be sent to the conductive cantilever 1C, and it is possible to effectively prevent the electrical characteristic signal from being deteriorated by a disturbance such as a noise or a resistance component which is the drawback of the conventional method and to enhance the resolution or precision of the measurement data. Consequently, the quality of the conductivity of the cantilever does not greatly influence the precision in the measurement data. Correspondingly, the yield of the conductive cantilever 1C can also be enhanced.

<Fifth Embodiment>

In an AFM according to a fifth embodiment, an insulating cantilever 1I is constituted as a cantilever 1 and a memory 13b or a microprocessor 13c is constituted as a semiconductor device 13 to be bonded to a side surface of a conductive probe 2C of the cantilever 1. A whole structure is the same as that in the conventional example shown in FIG. 11, the semiconductor device 13 is the same as that in the fourth embodiment shown in FIGS. 5 and 6, and the relationship of an electrical connection is the same as that in the second embodiment shown in FIG. 4 (which is different only in that the memory 12b is replaced with the memory 13b or the microprocessor 13c).

An operation for measuring a current value through the AFM according to the fifth embodiment will be described below.

In the measuring operation, an amount of warpage of the insulating cantilever 1I is detected by a photodetector on each measuring point and concavo-convex portions formed on a surface of a sample 4 are measured in the same manner as in the fourth embodiment. At the same time, a voltage is applied between the sample 4 and the conductive probe 2C to measure a current value as an electrical characteristic signal on each measuring point. The electrical characteristic signal is stored or operated by the memory 13b or the microprocessor 13c. If necessary, subsequently, data based on the electrical characteristic signal stored in the memory 13b or operated by the microprocessor 13c are transmitted to a signal processor 10 through an output signal line L2b and a signal cable 9.

In the present embodiment, consequently, it is possible to effectively prevent a signal from being deteriorated by a disturbance such as a noise or a resistance component which is generated on a current path from the conductive probe 2C to the signal processor 10 in the same manner as in the fourth embodiment.

Examples of the memory 13b include a DRAM, an SRAM, a flash memory and the like in the same manner as the memory 12b. The function of the microprocessor 13c is the same as that of the microprocessor 12c.

As described above, the memory 13b for storing the electrical characteristic signal obtained by the probe for carrying out a measurement or the microprocessor 13c is bonded to the side surface of the probe in the present embodiment. In addition to the effect of the fourth embodiment, therefore, it is possible to further obtain an effect that a data retaining function or a data operating function on the computer side can be simplified in the same manner as in the second and third embodiments in a system for measuring an electrical characteristic of a sample which comprises an AFM and a computer.

<Sixth Embodiment>

Figure 7:
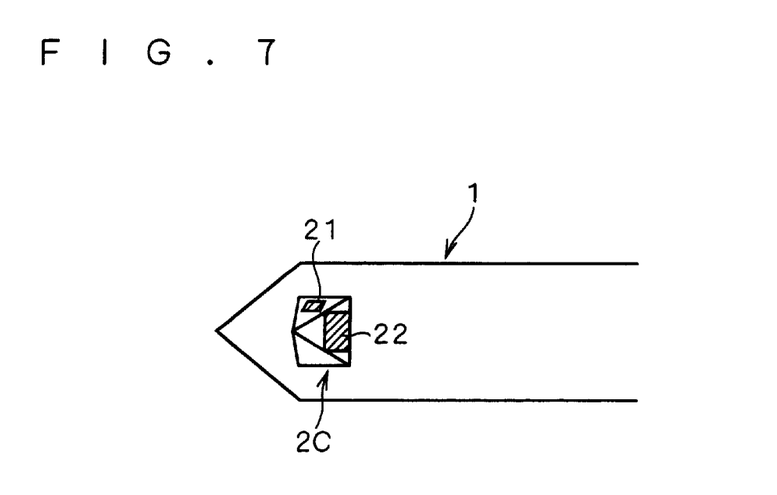
FIG. 7 is a diagram illustrating a structure of a cantilever of an AFM according to a sixth embodiment as seen from a front part.

FIG. 7 is a diagram illustrating a structure of a cantilever of an AFM according to a sixth embodiment of the present invention as seen from a front part (below).

As shown in FIG. 7, semiconductor integrated circuits 21 and 22 are fabricated in two side surfaces of a conductive probe 2C. In the sixth embodiment, an amplifying circuit (corresponding to the amplifying circuit 12a in the first embodiment), a memory (corresponding to the memory 12b in the second embodiment) or a microprocessor (corresponding to the microprocessor 12c in the third embodiment) is constituted as the semiconductor integrated circuits 21 and 22. A whole structure is the same as the structure shown in FIG. 11.

For example, in the case in which the semiconductor integrated circuit 21 is the amplifying circuit and the semiconductor integrated circuit 22 is the memory, an electrical characteristic signal is amplified by the amplifying circuit of the semiconductor integrated circuit 21 and is then written to the memory of the semiconductor integrated circuit 22.

Figure 8:
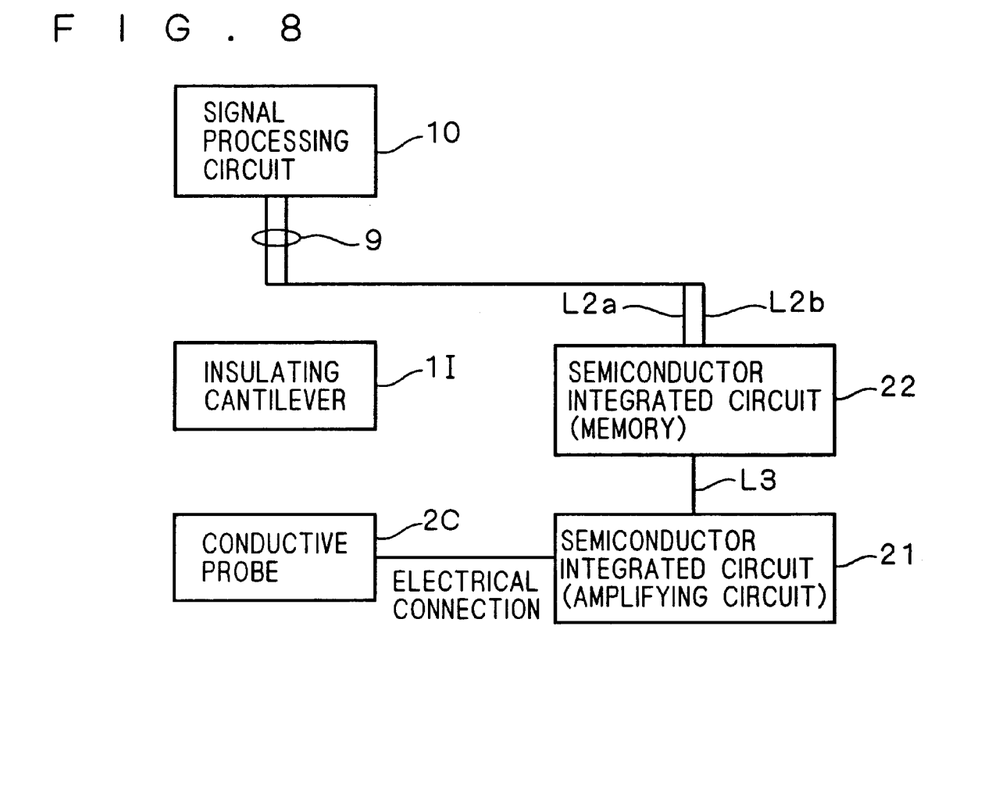
FIG. 8 is a diagram illustrating an example of an electrical connection state according to the sixth embodiment.

FIG. 8 is a diagram illustrating an electrical connection state according to the sixth embodiment based on the example described above. As shown in FIG. 8, the conductive probe 2C is electrically connected to the semiconductor integrated circuit 21 through a wiring or the like, the semiconductor integrated circuit 21 and the semiconductor integrated circuit 22 are connected to each other through a signal line L3, and the semiconductor integrated circuit 22 is connected to a signal cable 9 through a control signal line L2a and an output signal line L2b. In this case, it is necessary to constitute the signal cable 9 capable of transmitting and receiving a plurality of signals and it is desirable that the cantilever 1 should be replaced with an insulating cantilever 1I.

An operation for measuring a current value through the AFM according to the sixth embodiment will be described below.

In the measuring operation, an amount of warpage of the cantilever 1 is detected by a photodetector on each measuring point and concavo-convex portions formed on a surface of a sample 4 are measured in the same manner as in the conventional art. At the same time, a voltage is applied between the sample 4 and the conductive probe 2C to measure a current value as an electrical characteristic signal on each measuring point.

Then, the electrical characteristic signal is subjected to two of an amplification processing to be carried out by the amplifying circuit, a storage processing to be carried out by the memory, an operation processing to be carried out by the microprocessor and the like, and is thereafter transmitted to a signal processor 10 through the output signal line L2b shown in FIG. 8 or the like.

In the same manner as in the first to fifth embodiments, accordingly, it is possible to effectively prevent the electrical characteristic signal from being deteriorated by a disturbance such as a noise or a resistance component which is generated on a current path reaching the signal processor 10.

In addition to the effects of the first to fifth embodiments, plural kinds of semiconductor integrated circuits 21 and 22 are fabricated in the conductive cantilever 2C so that a more complicated processing can be carried out in the present embodiment. For example, it is possible to implement the operation processing or the like which is to be carried out by means of the microprocessor utilizing the electrical characteristic signal stored in the memory by constituting the semiconductor integrated circuit 21 and the semiconductor integrated circuit 22 by the memory and the microprocessor, respectively.

<Seventh Embodiment>

Figure 9:
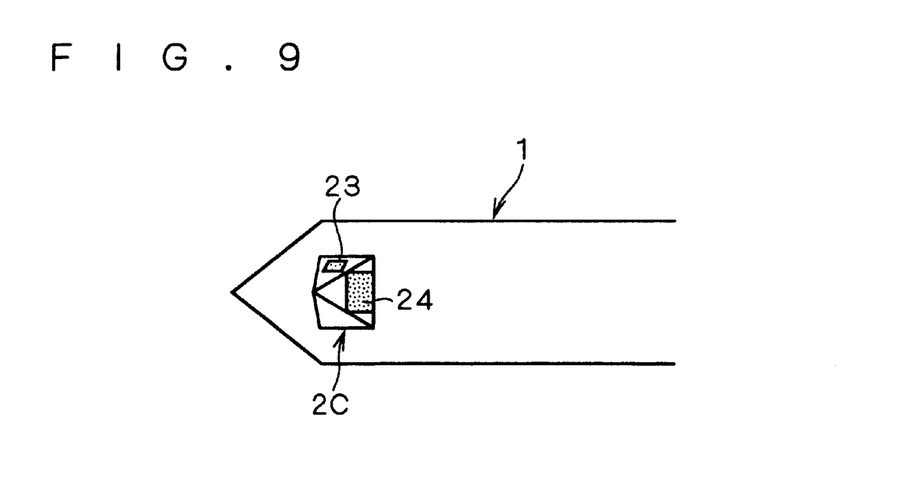
FIG. 9 is a diagram illustrating a structure of a cantilever of an AFM according to a seventh embodiment as seen from a front part.

FIG. 9 is a diagram illustrating a structure of a cantilever of an AFM according to a seventh embodiment of the present invention as seen from a front part (below).

As shown in FIG. 9, semiconductor devices 23 and 24 are bonded to two side surfaces of a conductive probe 2C. In the seventh embodiment, an amplifying circuit (corresponding to the amplifying circuit 13a in the fourth embodiment), a memory (corresponding to the memory 13b in the fifth embodiment) or a microprocessor (corresponding to the microprocessor 13c in the fifth embodiment) is constituted as the semiconductor devices 23 and 24. A whole structure is the same as the structure shown in FIG. 11. Moreover, the relationship of an electrical connection can also be implemented by the same structure as that in FIG. 8 (which is different in that the semiconductor integrated circuits 21 and 22 are replaced with the semiconductor devices 23 and 24).

An operation for measuring a current value through the AFM according to the seventh embodiment will be described below.

In the measuring operation, an amount of warpage of a cantilever 1 is detected by a photodetector on each measuring point and concavo-convex portions formed on a surface of a sample 4 are measured in the same manner as in the conventional art. At the same time, a voltage is applied between the sample 4 and the conductive probe 2C to measure a current value as an electrical characteristic signal on each measuring point.

Then, the electrical characteristic signal is subjected to two of an amplification processing to be carried out by the amplifying circuit, a storage processing to be carried out by the memory, an operation processing to be carried out by the microprocessor and the like, and is thereafter transmitted to a signal processor 10 through an output signal line L2b or the like.

In the same manner as in the fourth and fifth embodiments, accordingly, it is possible to effectively prevent the electrical characteristic signal from being deteriorated by a noise or a resistance component which is generated on a current path reaching the signal processor 10.

In addition to the effects of the fourth and fifth embodiments, in the same manner as in the sixth embodiment, plural kinds of semiconductor devices 23 and 24 are bonded to the conductive probe 2C so that a more complicated processing can be carried out in the present embodiment.

<Others>

While the signal processing section such as the amplifying circuit, the memory or the microprocessor has been described as the semiconductor integrated circuit 12 (21, 22) or the semiconductor device 13 (22, 23) in the present embodiment, other signal processing sections may be used if they have the function of suppressing a deterioration in the electrical characteristic signal obtained by the conductive probe 2C.

While the AFM for measuring the electrical characteristic of the sample has been taken as an example in the embodiments described above, the present invention can be applied to an STM to be a scanning probe microscope capable of obtaining measurement data based on the electrical characteristic signal given from the probe.

In combination of the sixth and seventh embodiments, it is also possible to constitute an AFM comprising the conductive probe 2C provided with a plurality of signal processing circuits in which a semiconductor integrated circuit is fabricated in one of side surfaces of the conductive probe 2C and a semiconductor device is bonded to the other side surface thereof.

While the invention has been shown and described in detail, the foregoing description is in all aspects illustrative and not restrictive. It is therefore understood that numerous modifications and variations can be devised without departing from the scope of the invention.

What is claimed is:

1. A scanning probe microscope having a probe for sample analysis and acquiring measurement data based on an electrical characteristic signal of a sample obtained from said probe, wherein said probe has a pyramid structure, and a signal processing section for performing a signal processing of said electrical characteristic signal to suppress a deterioration in said electrical characteristic signal is provided on/in a side surface of said probe.

2. The scanning probe microscope according to claim 1, wherein said signal processing section includes a semiconductor integrated circuit fabricated in a side surface of said probe.

3. The scanning probe microscope according to claim 1, wherein said signal processing section includes a semiconductor device adhered to a side surface of said probe.

4. The scanning probe microscope according to claim 1, wherein said signal processing section includes a n amplifying circuit for amplifying said electrical characteristic signal.

5. The scanning probe microscope according to claim 1, wherein said signal processing section includes a memory for storing said electrical characteristic signal.

6. The scanning probe microscope according to claim 5, wherein said memory includes a DRAM.

7. The scanning probe microscope according to claim 5, wherein said memory includes an SRAM.

8. The scanning probe microscope according to claim 5, wherein said memory includes a flash memory.

9. The scanning probe microscope according to claim 1, wherein said signal processing section includes a microprocessor for performing a predetermined operation processing for said electrical characteristic signal.

10. The scanning probe microscope according to claim 1, wherein said signal processing section includes a plurality of signal processing sections for performing signal processings which are different from each other, said plurality of signal processing sections are provided on/in different side surfaces of said probe, respectively, and are isolated from each other.

* * * * *